United States Patent
Tingler et al.

(10) Patent No.: US 10,872,311 B2
(45) Date of Patent: Dec. 22, 2020

(54) SYSTEMS AND METHODS OF TRACKING OBJECTS IN A RETAIL STORE UTILIZING MOBILE RFID TAG TRANSMITTER SYSTEMS

(71) Applicant: Walmart Apollo, LLC, Bentonville, AR (US)

(72) Inventors: Jeremy R. Tingler, Bentonville, AR (US); Nicholaus A. Jones, Fayetteville, AR (US); Alvin S. Taulbee, Springdale, AR (US); Todd D. Mattingly, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 100 days.

(21) Appl. No.: 16/127,865

(22) Filed: Sep. 11, 2018

(65) Prior Publication Data

US 2019/0080281 A1 Mar. 14, 2019

Related U.S. Application Data

(60) Provisional application No. 62/556,716, filed on Sep. 11, 2017.

(51) Int. Cl.
*G06K 7/10* (2006.01)
*G06Q 20/20* (2012.01)
(Continued)

(52) U.S. Cl.
CPC ....... *G06Q 10/087* (2013.01); *G06K 7/10475* (2013.01)

(58) Field of Classification Search
CPC ............ G06K 7/10475; G06K 19/0723; E05B 73/0017; G08B 13/2402
See application file for complete search history.

(56) References Cited

U.S. PATENT DOCUMENTS 6,233,776 B1 5/2001 Blum
7,271,724 B2 9/2007 Goyal
(Continued)

FOREIGN PATENT DOCUMENTS

| CN | 101435872 | 9/2011 |
|---|---|---|
| WO | 2005071597 | 8/2005 |
| WO | 2012102608 | 8/2012 |

OTHER PUBLICATIONS

Flexiray; "RFID Ground, Floor & Mat Antennas"; https://www.flexiray.com/rfid-applications/ground-floor-mats; Nov. 10, 2016; pp. 1-3.

(Continued)

*Primary Examiner* — Talia F Crawley
(74) *Attorney, Agent, or Firm* — Fitch, Even, Tabin & Flannery LLP

(57) ABSTRACT

In some embodiments, systems and methods are provided to track objects at a retail store, comprising: a mobile RFID transmitter system comprising an array of RFID tags; multiple RFID tag readers; a tracking control circuit communicatively coupled with the multiple RFID tag readers, and configured to: receive, from a sub-set of RFID tag readers, RFID tag information of each detected first set of RFID tags of the array of RFID tags; obtain a first set of rules and evaluate over time the received RFID tag information and identify over time threshold changes from a set of base information of received RFID signals from the array of RFID tags, wherein the threshold change is consistent with a first object traveling between the array of RFID tags and a corresponding one of the first sub-set of RFID tag readers; and track the first object.

20 Claims, 5 Drawing Sheets

(51) Int. Cl.
*G07G 1/00* (2006.01)
*G06Q 10/08* (2012.01)

(56) References Cited

U.S. PATENT DOCUMENTS

| | | | | |
|---|---|---|---|---|
| 7,518,511 | B1* | 4/2009 | Panja | G06Q 10/08 |
| | | | | 340/572.1 |
| 7,667,572 | B2 | 2/2010 | Husak | |
| 9,111,157 | B2 | 8/2015 | Christopher | |
| 9,722,715 | B2* | 8/2017 | Nair | H04B 17/318 |
| 10,467,443 | B2* | 11/2019 | Jones | G06K 7/10356 |
| 10,497,239 | B2* | 12/2019 | Jeon | G06K 7/10475 |
| 10,558,829 | B2* | 2/2020 | Jones | G06K 7/10475 |
| 10,636,267 | B2* | 4/2020 | Jeon | G06K 7/10475 |
| 2004/0222896 | A1 | 11/2004 | Power | |
| 2006/0202832 | A1 | 9/2006 | Reznik | |
| 2007/0124216 | A1* | 5/2007 | Lucas | G06Q 30/02 |
| | | | | 705/26.1 |
| 2007/0159332 | A1 | 7/2007 | Koblasz | |
| 2007/0279193 | A1* | 12/2007 | Tanaka | G06K 7/10356 |
| | | | | 340/10.2 |
| 2007/0282716 | A1* | 12/2007 | Branigan | G06Q 30/0601 |
| | | | | 705/28 |
| 2009/0182630 | A1* | 7/2009 | Otto | G06Q 20/20 |
| | | | | 705/14.1 |
| 2013/0120116 | A1* | 5/2013 | Moshfeghi | G06K 7/00 |
| | | | | 340/10.1 |
| 2013/0257598 | A1* | 10/2013 | Kawaguchi | G06K 7/10168 |
| | | | | 340/10.2 |
| 2015/0235066 | A1 | 8/2015 | Hattori | |
| 2017/0063476 | A1* | 3/2017 | Nair | G06K 7/10297 |
| 2018/0137456 | A1* | 5/2018 | Fan | G06Q 10/087 |
| 2018/0350218 | A1* | 12/2018 | Jeon | G08B 13/19645 |
| 2019/0050613 | A1* | 2/2019 | Wilkinson | G06Q 10/087 |
| 2019/0080280 | A1* | 3/2019 | Tingler | G06K 7/10475 |
| 2019/0329421 | A1* | 10/2019 | Deyle | B25J 11/008 |
| 2020/0082692 | A1* | 3/2020 | Jeon | G08B 21/0275 |

OTHER PUBLICATIONS

RFID Connect; "AdvanMat: RFID floor mat"; http://www.rfidconnect.com/productdetails.aspx?id=ab1ec55e6eb645dfae16d6f6c4625b1b; Nov. 10, 2016; pp. 1-2.

* cited by examiner

SYSTEMS AND METHODS OF TRACKING OBJECTS IN A RETAIL STORE UTILIZING MOBILE RFID TAG TRANSMITTER SYSTEMS

CROSS-REFERENCE TO RELATED APPLICATION

This application claims benefit of U.S. Provisional Application No. 62/556,716, filed Sep. 11, 2017, which is incorporated herein by reference in its entirety.

TECHNICAL FIELD

This invention relates generally to track objects in a retail store.

BACKGROUND

Retail stores continue to be a primary way in which people purchase products for consumption and use. Customers enter the store and often push carts or carry baskets while collecting products the customer is going to purchase. The products are distributed throughout a sales floor of the retail store and accessible to customers to retrieve. There continues to be a need to provide a positive shopping experience for customers.

BRIEF DESCRIPTION OF THE DRAWINGS

Disclosed herein are embodiments of systems, apparatuses and methods to track objects through a retail store. This description includes drawings, wherein.

Figure 1:
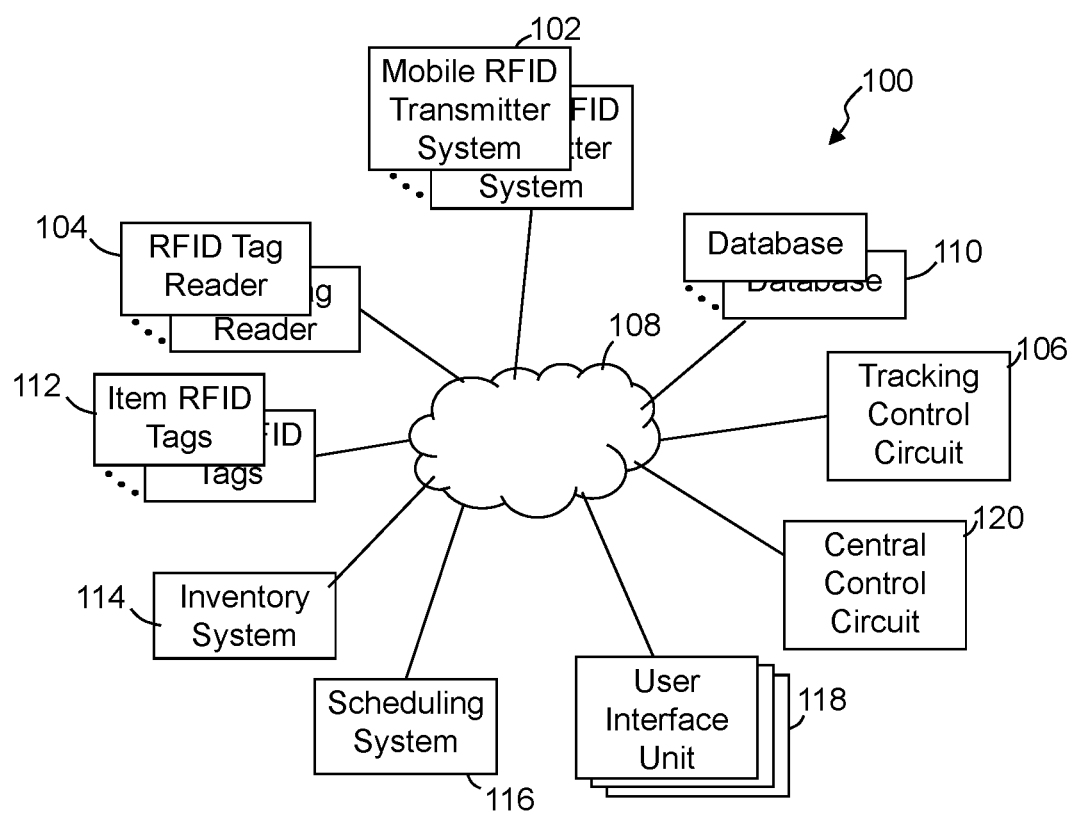
FIG. 1 illustrates a simplified block diagram of an exemplary retail store RFID customer tracking system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to autonomously track customers and/or carts at a retail store or retail shopping facility that customers visit to view, select and purchase products. Some shopping facilities position numerous products throughout a sales floor that are to be sold and/or distributed to customers. The facility may be any size or format, and may include products from one or more merchants. For example, a facility may be a single store operated by one merchant, a chain of two or more stores operated by one entity, or may be a collection of stores covering multiple merchants. Some embodiments provide a retail store radio frequency identification (RFID) customer tracking system that includes a mobile RFID transmitter system comprising an array of multiple RFID tags. The RFID transmitter system is configured to moveably be positioned at substantially any relevant travel area within the retail store where movement of customers, carts, baskets, pallet jacks and/or other such objects through at least one or more travel areas is to be tracked. The tracking system further includes multiple RFID tag readers positioned at fixed locations throughout the retail store, and can include at least a first sub-set of at least one of the multiple RFID tag readers positioned to detect RFID signals from the array of multiple RFID tags. A tracking control circuit can further be included in the tracking system and can communicatively couple with the multiple RFID tag readers. The tracking control circuit can implement code stored in memory and configured to receive, from the first sub-set of RFID tag readers, RFID tag information of each detected first set of RFID tags of the array of RFID tags. A first set of rules can be obtained to identify changes in RFID tag information, and used to evaluate over time the received RFID tag information and identify over time threshold changes from a set of base information of received RFID signals from the array of RFID tags being read at each of the first sub-set of RFID tag readers. In some implementations, the threshold change is consistent with a predefined object traveling between at least a portion of the array of RFID tags and a corresponding one of the first sub-set of RFID tag readers. The tracking control circuit is further configured to track the predefined object without obtaining a unique identifier of the predefined object as the predefined object moves relative to the RFID transmitter system and along at least a travel area of the retail store in which the RFID transmitter system is positioned as a function of the detected changes from the base information of the received RFID signals from the array of RFID tags being read over time.

Figure 2:
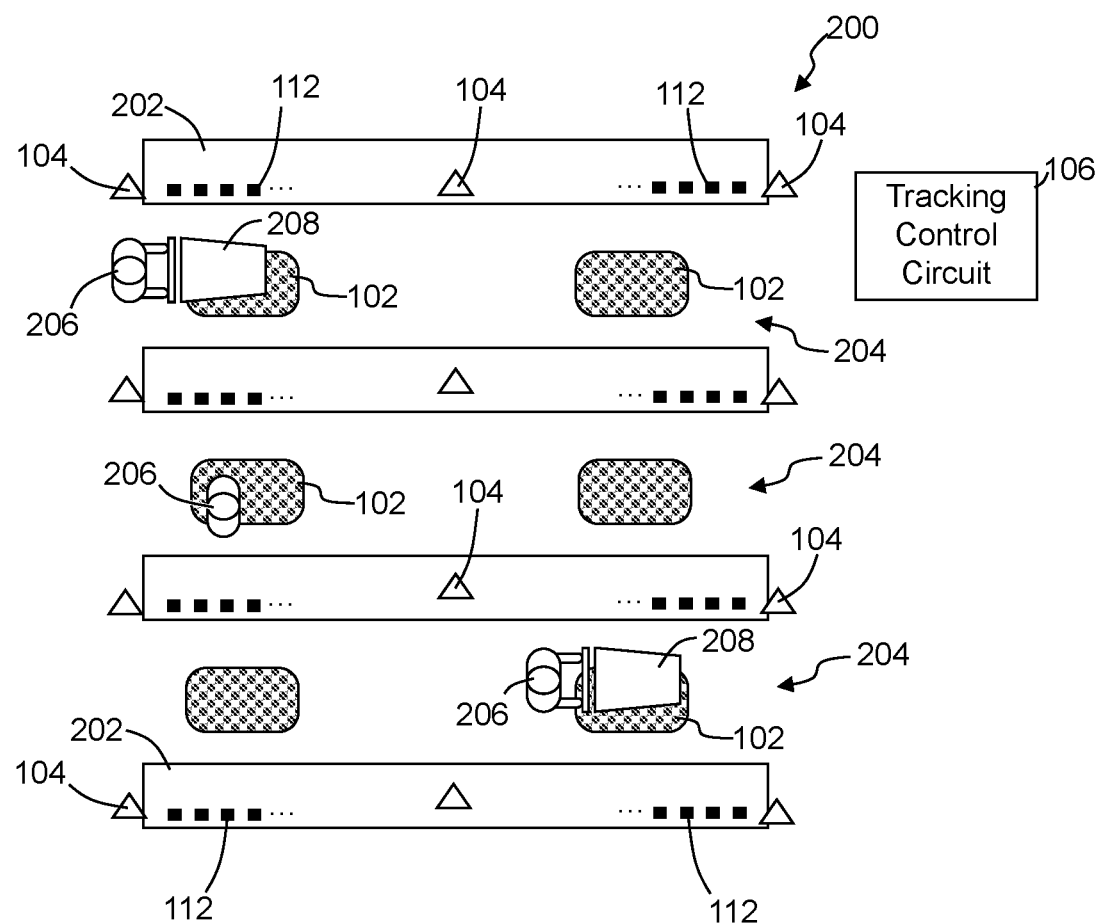
FIG. 2 illustrates a simplified overhead view of at least a portion of an exemplary retail store that includes an RFID customer tracking system, in accordance with some embodiments.
Figure 3:
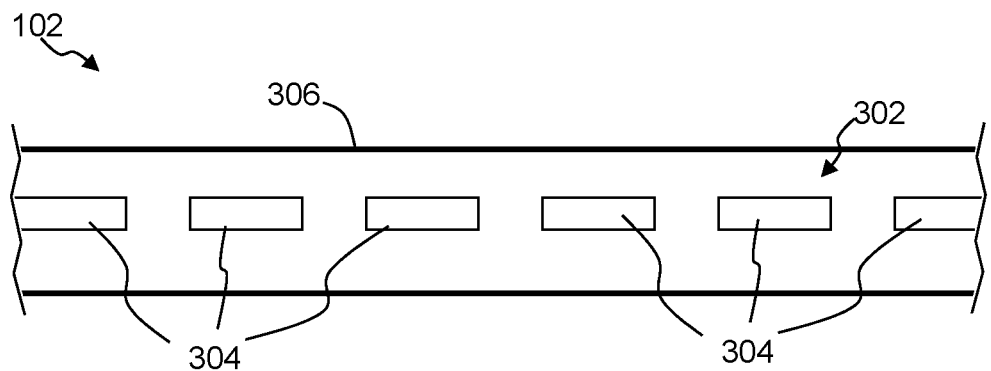
FIG. 3 illustrates a simplified block diagram, cross-sectional view of an exemplary mobile RFID transmitter system with an array of multiple tracking system RFID tags, in accordance with some embodiments.
Figure 4:
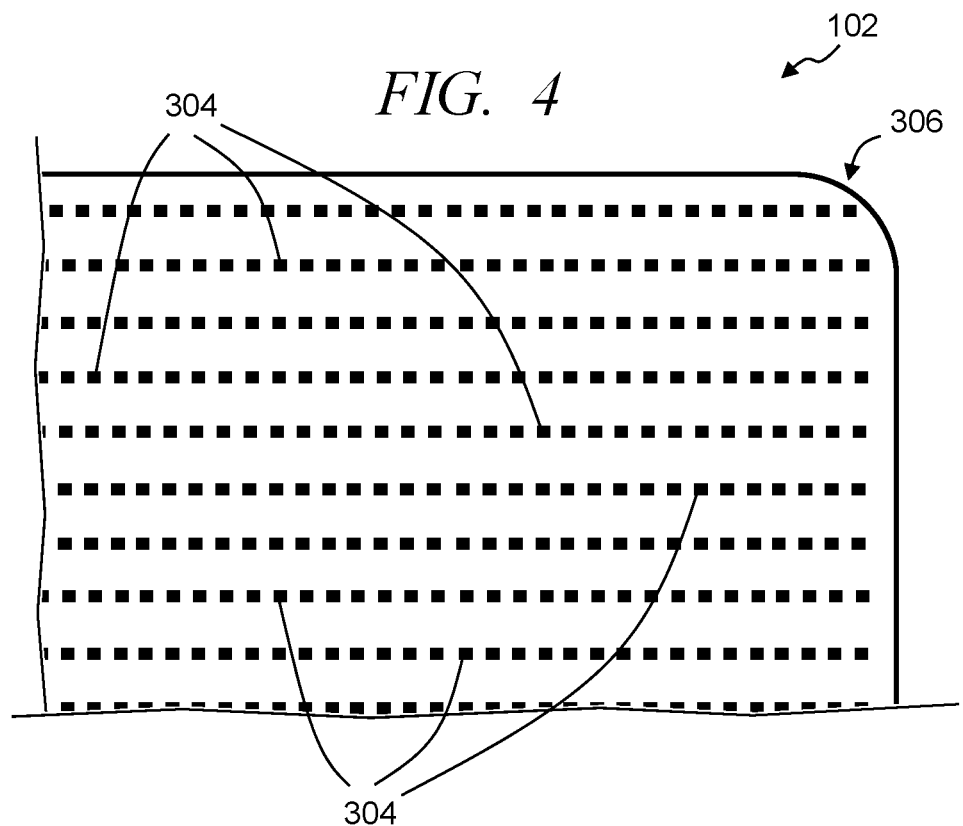
FIG. 4 illustrates a simplified, partially transparent overhead view of an exemplary mobile RFID transmitter system, in accordance with some embodiments.

FIG. 1 illustrates a simplified block diagram of an exemplary retail store RFID customer tracking system 100, in accordance with some embodiments. FIG. 2 illustrates a simplified overhead view of at least a portion of an exemplary retail store 200 or shopping facility that includes an RFID customer tracking system 100, in accordance with some embodiments. FIG. 3 illustrates a simplified block diagram, cross-sectional view of an exemplary mobile RFID transmitter system 102 with an array 302 of multiple tracking system RFID tags 304, in accordance with some embodiments. FIG. 4 illustrates a simplified, partially transparent overhead view of an exemplary mobile RFID transmitter system 102, in accordance with some embodiments. Referring to FIGS. 1-4, the customer tracking system 100 includes at least one and typically multiple mobile RFID transmitter systems 102, and multiple RFID tag readers 104 that are communicatively coupled to one or more tracking control circuits 106 over one or more communication and/or computer networks 108. The RFID tag readers 104 are distributed through the retail store 200, with at least some of the multiple RFID tag readers being positioned at fixed locations throughout the retail store. In some implementations, the RFID tag readers 104 are distributed to provide one or more arrays each establishing a read grid. The tracking control circuit 106 is further communicatively coupled with one or more databases 110 (e.g., rules database, tag read database, inventory database, worker database, customer database, etc.), which may be maintained in memory within the tracking control circuit 106, memory directly coupled with the tracking control circuit and/or remote memory.

Further, some if not all of the RFID tag readers 104 are configured to read item RFID tags 112 affixed to or incorporated into and/or affixed to items packaging of items being sold from the retail store (e.g., boxed food items, canned food items, cleaning supply items, produce items, frozen food items, consumer electronic goods, health products, beauty products, and other such items) that are positioned on product support devices 202 (e.g., shelves, modulars, racks, endcaps, etc.). The product support devices 202 are positioned throughout the retail store 200. The placement of the product support devices 202 establishes travel areas 204 along which people 206 (e.g., customers, workers, etc.) can move through the retail store 200, with at least some of the travel areas 204 being large enough to allow shopping carts 208, pallet jacks, baskets, and/or other movable objects to be moved through the retail store.

In some embodiments, the RFID customer tracking system 100 further includes or communicatively couples with an inventory system 114 that maintains and updates an inventory database of products believed to be available at the retail store, and in some instances products ordered and expected to be received. The inventory system 114 may include a product ordering system or the RFID customer tracking system 100 may include a separate product ordering system that communicates with at least the inventory system. Further, the RFID customer tracking system 100 may include and/or couples with one or more scheduling systems 116 that schedule workers, tasks to be performed at the retail store, and/or other such scheduling. In some embodiments, the RFID customer tracking system 100 further includes and/or communicatively couples with user interface units 118 (e.g., smartphones, tablets, scanning devices, and/or other such devices that are utilized by workers at the retail store), and/or the tracking control circuit is in communication with customer user interface units (e.g., smartphones, tablets, etc.) or receives communications via the distributed network 108 (e.g., the Internet) from a separate network server associated with the retail store.

In some embodiments, the tracking control circuit may further control one or more systems (e.g., RFID tag readers, lighting systems, advertisement systems, product scanning systems, etc.) at the retail store, and use the location information of one or more customers, workers, carts, and/or other such objects in controlling these systems. Additionally or alternatively, one or more retail store central control circuits 120 or power consumption control circuits may be included in the RFID customer tracking system 100 and/or are communicatively coupled via the one or more network 108 with the tracking control circuit 106. The central control circuit may further communicatively couple with the RFID tag readers 104, video surveillance cameras and/or systems, other security systems, lighting control systems, advertisement systems, product scanning systems (e.g., Scan&Go systems from Wal-Mart Stores, Inc.), and/or other such systems operating at the retail store. Location information and/or predicted direction of movement of one or more customers, carts, workers and/or other objects can be communicated to the central control circuit 120. Based on this location information and/or movement tracking information, the tracking control circuit 106 and/or the central control circuit 120 can activate, deactivate, power down, shift to a sleep mode, shift to a reduced power consumption mode one or more systems at the retail store 200. This control of these various systems throughout the retail store can result in reduced power consumption, reduced operational time of systems, and other such benefits.

The mobile RFID transmitter systems 102 include an array 302 of multiple RFID transmitter system RFID tags 304 secured within a housing 306, shell, casing, or the like that provides some protection to the RFID tags 304 as people 206, carts 208, pallet jacks, and/or other objects to travel over the RFID transmitter system 102. In some embodiments the housing 306 is rigid (e.g., plastic, aluminum, silicon, other such rigid material, or combination of materials), while in other implementations, the housing is elastic and/or compressible allowing the housing to partially deform while still protecting the RFID tags 304 (e.g., rubber, foam, silicon, other such materials, combination of such materials), or is partially rigid and partially elastic. Typically, the housing provides protection for the RFID tags 304 as people, carts and other objects travel over the RFID tags.

The RFID tags 304 are typically secured in fixed positions relative to the other RFID tags and/or the housing 306. In some instances, portions of the housing surround and/or encase the RFID tags (e.g., the housing 306 is formed of a rubber that is molded about the RFID tags 304 of the array 302. The RFID tags 304 of the array may be positioned in a grid pattern, a hexagonal pattern, pentagonal pattern, or other configuration. Typically, the locations within the RFID transmitter system of each RFID tags is known, allowing the use of obtained RFID signals to identify neighboring RFID tags that are not being detected. At least some of the RFID transmitter systems 102 are configured to readily be moved, and thus be moveably positioned at substantially any relevant travel area 204 within a retail store where movement of objects (e.g., people 206, shopping carts 208, baskets, pallet jacks, etc.) through the travel areas 204 is to be tracked. For example, typically one or more RFID transmitter systems 102 are configured to be moved and placed onto the floor of a travel area 204 such that people 206, carts 208 and other objects travel over the RFID transmitter system 102. Further, at least some of the RFID transmitter systems are relatively light weight, being less than 100 lbs., and typically less than 50 lbs. For example, in some implementations the RFID transmitter is movable by a single person. In some implementations, one or more securing mechanisms may be incorporated within the housing 306 and/or secured with the housing, such as one or more suction cup mechanisms, magnets and/or other such mechanisms formed in and/or secured relative to a bottom or surface of the RFID transmitter system. The dimensions of the RFID transmitter system can depend on the number of RFID tags 304 to be included in the array, an area to be covered by the RFID transmitter system, a distance between RFID tags 304 and/or a degree of desired accuracy, and/or other such factors.

At least some of the multiple RFID tag readers 104 are positioned at fixed locations throughout the retail store 200. The RFID tag readers 112 are positioned in various locations and in some instances various orientations relative to one or more RFID transmitter system 102 and/or the items and corresponding item RFID tags 112. In some implementations one or more of the RFID tag readers 104 are positioned overhead (e.g., secured within the ceiling and/or suspended from the ceiling). Other RFID tag readers may be secured with product support devices 202, positioned on or within the floor, or otherwise positioned to receive RFID signals from one or more, and typically a sub-set of RFID tags 304 and/or item RFID tags 112. As introduced above, at least some of the RFID tag readers 104 may be positioned in a grid pattern relative to at least one or more portions of the sales floor. Further, many of the RFID tag readers are positioned to receive RFID signals from RFID tags 304 of the RFID transmitter system 102 and/or item RFID tags 112 positioned across one or more travel areas 204. As such, objects (e.g., people 206, carts 208, pallets of products, pallet jacks, baskets, and the like) moving along those travel areas 204 may pass between an RFID tag reader 104 and RFID tags 304 and/or item RFID tags 112, which often interferes with the RFID tag signals detected at the RFID tag reader.

The RFID transmitter system 102 can be positioned so that at least one RFID tag reader 104, and typically a set of multiple RFID tag readers can receive RFID signals from the RFID tags 304 of the RFID transmitter system 102. Accordingly, a sub-set of the multiple RFID tag readers 104, including at least one of the RFID tag readers 104, is positioned to detect RFID signals from the array 302 of multiple RFID tags 304 of at least a first mobile and movable RFID transmitter system 102. RFID tag information is received and/or determined based on the received RFID signals from at least the RFID tags 304 of the RFID transmitter system 102. For example, the RFID tag information may include tag identifier information of the RFID tag transmitting the signal and/or corresponding item, receive signal strength indicator (RSSI) determined from the received signal, a read rate at which a particular RFID tag is read, which one or more antennas of an RFID tag reader are detecting, angle of reception, and/or other such RFID tag information.

Further, each of the RFID tag readers 104 and/or the tracking control circuit 106 are configured to track over time the RFID tag information of each RFID tag 304 of an array 302 of RFID tags being read at each of the sub-set of RFID tag readers, and determine from this tracking over time a set of base information from the received RFID signals from each RFID tag 304 the array of RFID tags being read. This set of base information can be defined by an average; a mean; a median; within a range (e.g., less than two standard deviations, within a threshold, etc.); other statistically determined value, other base information, or a combination of two or more of such base data. Further, the determined base information may be determined taking into consideration variations, which may include discarding some information, such as information deemed beyond a threshold, different by two or more standard deviations, some other variation dictated by one or more rules. For example, some embodiments identify a series of variations in RSSI and/or read rate greater than a cart threshold range and/or variations occurring within a threshold time when a cart 208 passes between an RFID tag 304 and an RFID tag reader 104, a threshold reduction in RSSI and/or read rate greater than a person threshold when a person passes between an RFID tag 304 and an RFID tag reader 104.

Figure 5:
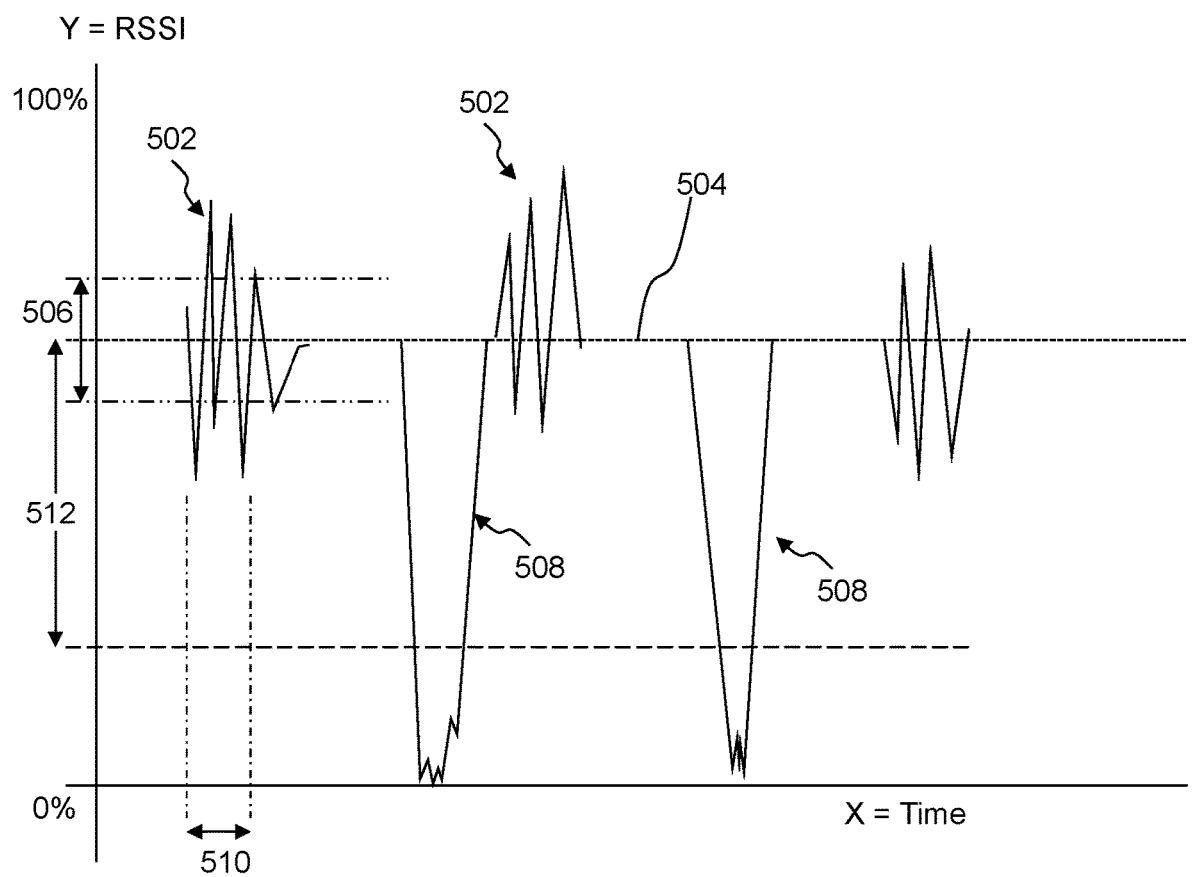
FIG. 5 illustrates a simplified graphical representation of exemplary RSSI and read rates corresponding to an RFID tag over time, in accordance with some embodiments.

FIG. 5 illustrates a simplified graphical representation of exemplary RSSI and read rates corresponding to an RFID tag over time, in accordance with some embodiments. It has been determined that due to the interference, absorption and/or reflection of RFID signals caused by carts 208, the cart RSSI variations 502 or fluctuations (cart RSSI variations) are at levels and/or rates that are greater than a base RSSI 504 detected when there is nothing between an RFID tag and an RFID tag reader. The base RSSI 504 is illustrated as a line, which may correspond to an average, mean, or some other determined base. In some instances, the base RSSI is defined by a range determined based on fluctuations in RSSI detected over time, when a cart, person or other temporary object is temporarily between the RFID tag and RFID tag reader. Accordingly, an RSSI threshold range 506 from an average or other base RSSI 504 can be identified over time that corresponds to cart RSSI variations 502 when a cart 208 passes between an RFID tag and an RFID tag reader. Further, some embodiments evaluate the duration of fluctuation relative to a threshold fluctuation duration 510 or range of durations corresponding to carts passing between a set of RFID tags of an RFID transmitter system 102 and one or more RFID tag readers 104.

This fluctuation may be learned over time based on scheduled "training" of the system, based on repeated detection of similar fluctuations that are within threshold variations, and/or other such detected consistent changes. Further, in some embodiments, the RSSI threshold range can be specific to a particular RFID tag 304 and a particular RFID tag reader 104, while in other instances, the RSSI threshold range may be determined based on a set of RFID tags relative to one or more RFID tag readers.

Additionally, it has been determined that due to absorption and interference caused by a person 206 passing between an RFID tag 304 and an RFID tag reader 104, the RSSI fluctuates including absorption RSSI drops 508, which is typically a greater drop than detected when a cart passes between the RFID tag and RFID tag reader. Accordingly, over time a person RSSI threshold change 512 can be determined that corresponds to a person passing between the RFID tag 304 and an RFID tag reader 104. Again, in some instances, the RSSI threshold change 512 can be specific between a particular RFID tag reader 104 and an RFID tag 304, while in other instances may be determined based on a set of RFID tags and one or more RFID tag readers. For example, the cart RSSI variation 502 may correspond to a 20 dBm, 40 dBm or other such change, while the person RSSI threshold change may correspond to an 80% reduction in RSSI over a period of time, substantially a complete lack of detected signal over a period of time, or other such change caused by the absorption and/or interference. For example, a baseline RSSI for RFID tags 304 of an RFID transmitter system 102 may have an RSSI value of approximately −40 dBm when nothing is between the RFID tags and the RFID tag reader 104. The same RFID tags when something is located between the RFID tag reader 104 and the tags may have an RSSI value of approximately −60 dBm. When an object, such as a cart 208 or basket is interfering with or enhancing the RFID signal, the RSSI value will similarly change. For example, the RSSI value may decrease when objects are between the RFID tags 304 and the RFID tag reader 104. Additionally, dependent upon the object, the RSSI value may increase when the object is positioned between an RFID tags 304 and an RFID tag reader 104. The presence of an object can be determined based on these fluctuations from the baseline value. That is, when the RFID signal is different than the baseline value by a threshold and/or for a threshold period of time, one or more rules may dictate that an object is positioned between the RFID tag 304 and the RFID tag reader 104. Still further, some embodiments consider sequential sets of RFID tags 304 that are affected by an object in determining whether the object is a person, cart, basket, or other object. Because carts 208 are relatively uniform in size (e.g., length, width, height, etc.), the amount of time that a signal is affected (e.g., reduction in RSSI, reduction or increase in read rate, different antenna, difference in a "non-read" period, etc.) from an RFID tag 304 is indicative of a cart 208 passing between the RFID tag and an RFID tag reader 104. In addition consistent patterns in affected signals of different RFID tags and/or sets of RFID tags can be used to distinguish between objects (e.g., smaller clusters of RFID tags separated by a distance can be used to distinguish between a person's feet interfering with RFID tags, versus a continuous affect for a period of time corresponding to a cart passing between a set of RFID tags and an RFID tag reader). In some instances, the direction from which the RFID signal is detected and/or emanates can be used to determine or estimate the type of object (e.g., reflections, different RFID tags within a cart or basket, etc.). For example, an object in a cart 208 or basket may reflect an RFID signal, causing the reflected RFID signal to be detected by an antenna that is different than another antenna that would typically receive the signal, and/or the reflected RFID signal may be read by an RFID tag reader 104 that would not typically read an RFID signal from that RFID tag.

Some embodiments further evaluate the fluctuations to determine dwell times and/or durations that a customer is at a location or within an area. For example, one axis of the graphical representation may correspond to time. Accordingly, the width of the fluctuation may correspond to a time the object is interfering with the reading of the RFID tags and/or positioned at least partially between the RFID tag readers 104 and the RFID tags. The dwell times can be used to evaluate the customer's shopping habits, predict inventory changes, evaluate product placement (e.g., extended dwell times by customers may indicate they are having difficulty finding a product), and/or other such information. Similarly, dwell times may be used to evaluate whether customers are considering advertisements, changes in pricing, and/or other such factors.

Referring to FIGS. 1-5, the tracking control circuit 106 communicatively couples with the multiple RFID tag readers 104 over one or more distributed networks 108 (e.g., local area network (LAN), wide area network (WAN), Internet, wireless (e.g., Bluetooth, Wi-Fi, etc.), and/or other such networks). In some embodiments, the tracking control circuit includes and/or accesses memory storing code, and in implementing the code is configured to receive, from a sub-set of one or more RFID tag readers 104, RFID tag information of each detected set of RFID tags 304 of the array 302 of RFID tags of at least one RFID transmitter system 102. One or more rule sets can be accessed and obtained that are applied to identify changes in RFID tag information. The one or more rule sets can be applied and used by the tracking control circuit to evaluate over time the received RFID tag information and identify over time threshold changes from the set of base information of received RFID signals from the array of RFID tags being read at each of the sub-set of RFID tag readers. The rules can include applying one or more thresholds, statistical evaluations (e.g., determining an average, a median, a mode, a maximum, etc.), confirming changes over a threshold time, and/or other such rules. In other embodiments, one or more of the rule sets may be applied by the RFID tag reader.

As described above, the detected threshold change in some embodiments is consistent with an object (e.g., person, cart, pallet jack, basket, etc.) traveling between the array 302 of RFID tags 304 and a corresponding one of the sub-set of RFID tag readers 104. Further, the tracking control circuit 106 is configured to utilize the detected changes in RFID tag information over time to track the object without obtaining a unique identifier of the object as the object moves relative to the RFID transmitter system and along one or more of the travel areas 204 of the retail store 200 in which the RFID transmitter system 102 is positioned. The location and tracking of movement of the object, in some embodiments, is determined as a function of the detected changes from the base information 504 of the received RFID signals from the array 302 of RFID tags 304 being read over time. Again, the retail store includes multiple different RFID tag readers 104 distributed about the retail store 200. In many implementations, RFID signals transmitted by RFID tags 304 from a single RFID transmitter system 102 are detected by multiple RFID tag readers 104. As changes in RFID tag information are detected over time, those changes can correspond to movement along the travel areas 204 of the retail store. Further, a single RFID tag reader 104 may detect changes in RFID tag information from a first sub-set of RFID tags 304 of an RFID transmitter system 102, and subsequently detect changes to a second sub-set of RFID tag information from a second set of RFID tags 304 of the same RFID tag transmitter. Similarly, the detected RFID tag information from the first sub-set of RFID tags may return to base levels corresponding to the object passing beyond the first sub-set of RFID tags and no longer being between the first sub-set of RFID tags and the RFID tag reader. This change and/or return to the base information allows the tracking control circuit 106 to detect the movement of the object, and based on the sequence of the detected changes of different RFID tags of the RFID transmitter system the tracking control circuit can identify a direction of travel of the object, and in some instances a speed of movement of the object. The sequential detected changes in RFID tag information corresponding to other RFID transmitter systems 102 and/or changes of RFID tag information corresponding to item RFID tags 112, the movement of the object through the retail store 200.

In some embodiments, other RFID tags are utilized in cooperation with the RFID tags 304 of the RFID transmitter systems 102. For example, item RFID tags 112 may be used in part to detect the presence of a shopping cart, person or other object at a location and to track movement of that object as it moves through the retail store. In some implementations, the tracking control circuit 106 obtains a second set of one or more rules that are applied to identify changes in RFID tag information. For example, the tracking control circuit uses an item RFID tag evaluation set of rules to evaluate RFID tag information associated with multiple different item RFID tags 112 and identify over time threshold changes in at least one characteristic of the RFID tag information corresponding to the multiple item RFID tags being read at each of a sub-set of at least one of the multiple RFID tag readers. The changes in characteristics may be similar to those described above (e.g., predefined and/or consistent changes determined over time), such as RSSI changes, rate of detection changes, identification of antenna detecting the RFID signal, detecting an RFID tag that was previously not detected, and/or other such characteristics of RFID information corresponding to the item RFID tags 112 and/or other RFID tags.

Because at least some of the RFID tags 112 are cooperated with items 302 intended to be purchased by customers, the RFID tags change over time. For example, RFID tags are removed not to be returned when customers remove a product, and different RFID tags are later positioned in their place when workers restock the shelf 304 or other product support 202. Accordingly, the tracking control circuit 106 can further track the loss of detection of RFID tags. In some instances, when the loss is greater than a removal threshold period of time, the tracking control circuit considers the corresponding item 302 and accompanying RFID tag 112 to have been removed by a customer. This removal of an item may further be confirmed when the RFID tag corresponding to that item is subsequently detected by a different RFID tag reader 104 that previously had not detected the RFID tag indicating a movement of the RFID tag, detected at a point-of-sale (POS) system of the retail store, or other such confirmation of removal. Similarly, the tracking control circuit often receives RFID tag information from new RFID tags 112 from a particular RFID tag reader 104 that previously had not detected that RFID tag. When that tag is repeatedly detected a threshold number of times or over a threshold period of time, the tracking control circuit 106 may designate that new RFID tag as a newly stocked item. Additionally or alternatively, confirmation of restocking may be received from an RFID tag reader, a separate bar code reader, or other product identifying system operated by a worker or otherwise implemented as items are restocked on the shelf 304 or other product support system 202.

The tracking control circuit 106 can be configured, in some implementations, to track an object (e.g., person 206, cart 208, basket, etc.) without obtaining the identifier of the object as the object moves along at least a portion of the travel area as a function of timing of the detected changes in the at least one characteristic of the RFID tag information corresponding to the multiple item RFID tags being read at each of a sub-set of RFID tag readers 104. The timing of the detected changes in RFID information can further be utilized by the tracking control circuit in determining a location, direction of travel and/or track the movement of the object through one or more portions of the retail store. Further, the consistency between changes in different RFID information corresponding to different RFID tags is utilized by the tracking control circuit as at least part of a confirmation that the same object is causing the changes in RFID information. In some embodiments, the tracking control circuit 106 uses a set of rules in tracking the object to confirm that the detected changes in at least one characteristic of the RFID tag information corresponding to a subsequent set of RFID tags being read at a subsequent RFID tag reader of a sub-set of RFID tag readers are within a threshold consistency of detected changes in the at least one characteristic of RFID tag information corresponding to a previous set of multiple RFID tags being read at a previous RFID tag reader of the sub-set of RFID tag readers. The tracking control circuit can associate the changes in RFID tags being read at the subsequent RFID tag reader as being causes by the same object based on the determined consistency within threshold variations of the one or more characteristics. The tracking control circuit 106 may, in some implementations, additionally utilize the repeated detection at different RFID tag readers corresponding to detected movement of item RFID tags (e.g., that have been placed in a cart) and utilize the consistent detection at different RFID tag readers 104 in confirming the same cart and in tracking the movement of one or more objects. In some embodiments, the tracking control circuit 106, in using the second set of rules to identify the changes in the item RFID tags being read, is configured to identify at least a threshold increase in variation of RSSI corresponding to RFID tags being read at each of the sub-set of RFID tag readers 104.

As described above, the detected change in RFID information may correspond to increases in detection rate, decreases in detection rate, increases in signal strength, detecting RFID tags that were previously not detected by a particular RFID tag reader 104, identifying a change in antenna detecting an RFID signal, and/or other such changes. In some embodiments, the tracking control circuit 106 is configured to obtain a tracking set of rules to track one or more objects, and to use the tracking set of rules to evaluate RFID tag information and identify a loss of detection of at least a cluster of RFID tags 304 of an RFID transmitter system 102 at the same time with the cluster of RFID tags being tags that are close in proximity to each other and typically adjacent each other. Similarly, for example, the tracking control circuit 106 may, in some instances, identify a loss of a majority of the array of RFID tags 304 at the same time corresponding to an object interfering with the majority of the array of RFID tags. This loss may result from an object (e.g., a person) absorbing RFID signals, items within a cart absorbing RFID signals, a cart interfering with an RFID tag reader from accurately receiving RFID signals, and/or other such losses. For example, in some instances the tracking control circuit may detect the threshold change corresponding to RFID tags 304 of the RFID transmitter system 102 being blocked by a cart 208 and/or person 206.

Further, the detected threshold changes in one or more characteristics of an RFID signal from a set of RFID tags 304 of the RFID transmitter system 102 may further be utilized in approximating a size of an object that is being detected and/or tracked. In some embodiments, the tracking control circuit 106 is configured to obtain a size estimation set of rules to track the object. The size estimation set of rules can be used by the tracking control circuit to evaluate RFID tag information and estimate a size of the object based on a quantity of the RFID tags 304 of the array 302 of RFID tags that each have at least a threshold change from a base level (e.g., a threshold reduction in detected signal strength from a base signal strength). In some instances, a threshold number of the affected RFID tags 304 are confirmed to be clustered (e.g., adjacent to another affected RFID tag, or within a threshold distance of one or more other affected RFID tags). In some instances, a quantity of RFID tags 304 of the cluster may be confirmed by one or more subsequent clusters of affected tags having a similar number of affected RFID tags (e.g., within a threshold+/−variation). The size estimation set of rules may include and/or refer to a reference table that correlates a quantity of affected RFID tags to one or more estimated sizes (e.g., height, width, weight, etc.), may correlate a distance between sequential clusters of affected RFID tags and the quantities of affected RFID tags to one or more estimated sizes, rates or times between sequential affected clusters may be correlated to size, different dwell times and quantities of affected RFID tags during those dwell times may be correlated to estimated sizes, a combination of two or more of such correlations may be used, and/or other such rules. The correlations may be learned over time based on average sizes of customers, learned sizes of people relative to detected blocked clusters of RFID tags, and the like.

Further, some embodiments are configured to estimate a customer's age based on a quantity of the RFID tags blocked at a given time and/or sequential clusters of RFID tags detected. The tracking control circuit 106, in some embodiments, is configured to obtain an age estimation set of rules to track the first object, and use the age estimation set of rules to evaluate RFID tag information and identify the object is a customer and estimate an age of the customer based on detected sequential sets of the RFID tags of one or more arrays of RFID tags that each have at least a threshold change (e.g., threshold reduction in detected signal strength, threshold change in read rate, lack of detected signal for a threshold period, etc.) in one or more RFID information characteristics. Typically, the sequential sets of the RFID tags of the one or more arrays of RFID tags are sequential in time. Further, the rules may correlate distances between sets of affected tags to ages, correlate distances between sets of affected tags and the quantity of affected tags in the sets (e.g., an average quantity) to ages, correlate rates of occurrences of the sequential sets to ages, dwell times relative to sizes of affected tags of sets may be correlated to age, two or more of such correlations may be used, and/or other such rules.

As described above, the tracking control circuit is further configured to determine an object's direction of travel based on the affected RFID tags 304 and/or item RFID tags 112. In some embodiments, the tracking control circuit, in using a direction evaluation set of one or more rules and/or criteria, is configured to identify a direction the object (e.g., customer, worker, cart, basket, etc.) is traveling based on detected sequential sets of the affected RFID tags 304 of the array 302 of RFID tags of one or more RFID transmitter systems 102.

Some embodiments further utilize the tracked location to control systems and resources throughout the retail store. By identifying the location of customer, workers and the like, the system can control lighting systems, advertisement system, security systems, cameras, RFID tag readers, sensors, and other such systems within the retail store depending on locations of objects and/or directions of travel of objects. In some embodiments, the tracking control circuit 106 further couples with lighting systems and surveillance systems of the retail store, advertisement system, other security systems, cameras, RFID tag readers, sensors, and other such systems within the retail store. Based on location information corresponding to one or more tracked objects within the retail store the tracking control circuit is configured to activate, deactivate, power down, force to a sleep mode, change to a lower power consumption mode, change to a full on mode, and/or other such triggering. This can reduce the retail store power consumption, processing power, and other overhead, while improving efficiency, and without adversely affecting the customer experience and/or without adversely affecting worker productivity. For example, the tracking control circuit may issue instructions and/or commands to one or more lighting systems, one or more the surveillance systems and/or one or more RFID tag readers based on the location of one or more objects. As a specific example, the tracking control circuit 106 may utilize location information and/or tracked movement of customers to identify that there is no one within a threshold of an area of the shopping retail store, and direct the powering down of RFID tag readers and other sensors in that area, and direct one or more lighting systems corresponding to that area to be dimmed to a predefined lower power consumption mode. The tracking control circuit 106 and/or the central control circuit 120 may evaluate the location of the object relative to one or more thresholds (e.g., security camera threshold, lighting control threshold, advertisement control threshold, Scan&Go control threshold, and/or other such thresholds). For example, the object may be a customer and security components (e.g., cameras, sensors, etc.) may be powered down when the customer leaves an isle while lighting is maintained on; and may direct one or more lighting systems when the customer is three isles away, is 25 ft. from an area of the store, or some other threshold. In other instances, the tracking control circuit 106 may predict that a customer is expected to enter a certain area of the retail store based on a current location and the tracked movement of the customer (e.g., based on tracked movement the tracking control circuit knows where the customer has previously been, based on a shopping list, etc.), and direct the operation of lighting systems corresponding to that area to be at a desired level while the customer is in that area, direct the activation of one or more RFID tag readers and/or barcode readers, direct the activation of security cameras, and/or other such controls.

In some embodiments, the system includes a scheduling system 116 that is in communication with the tracking control circuit 106 and/or the central control circuit 120. Tasks can be identified that are to be performed based on the location, previous route and/or expected route of one or more objects. In some instances, the tracking control circuit can direct that a task is to be perform and notifies the scheduling system 116. The tracking control circuit can provide location information to the scheduling system to be used in instructing the task. Based on the task, the scheduling system can evaluates workers, scheduled task, expected tasks and the like to determine one or more workers to perform the task and schedules the task. The one or more workers are notified of the task and the scheduling of when that task is to be performed. Examples may include picking up a cart left for an extended period, helping a customer based on a dwell time in a particular location or area for more than a threshold, and/or other such tasks. Similarly, in some embodiments the tracking control circuit may evaluate quantities of customers passing through areas and their dwell times to predict levels of inventory. Information can be communicated to the inventory system 114 that may use this information in determining whether to direct restocking, reordering, and the like.

In some embodiments, the tracking control circuit obtains one or more sets of rules to detect an error in tracking. The one or more sets of rules can be used relative to the changes in parameters of RFID signals being detected to detect an instance where the change in the RFID tags being read cannot definitively be associated with one of a first object and a second object that are both moving along a travel area 204. Based on continued tracking of both the first object and the second object and corresponding changes in subsequent RFID tag reads, the tracking control circuit in some instance can identify that a portion of the determined path of the first object after the detection of the instance where the change in RFID tags being read could not be associated with one of the first object and the second object. The tracking control circuit can replace identified portion of the determined path associated with the first object, with a corresponding portion of a determined path associated with the second object after the detection of the instance where the change in RFID tags being read could not be associated with one of the first object and the second object. In some implementations, the tracking control circuit is further configured to determine an object's direction of travel based on the affected RFID tags. In some embodiments, the tracking control circuit, in using a direction evaluation set of one or more rules and/or criteria, is configured to identify a direction the object (e.g., customer, worker, cart, basket, etc.) is traveling based on detected sequential sets of the affected RFID tags.

Figure 6:
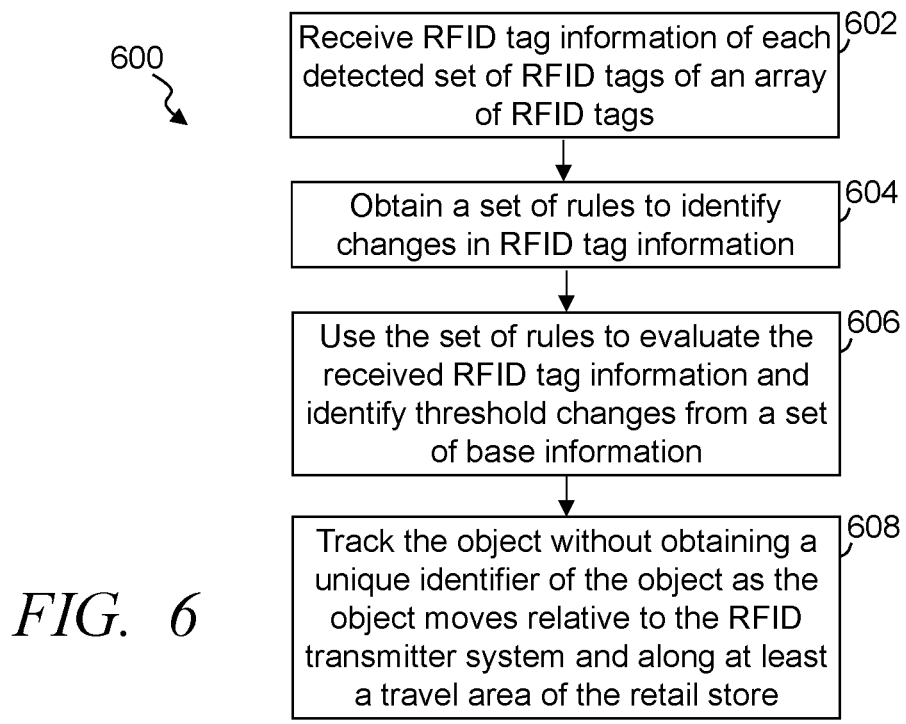
FIG. 6 illustrates a simplified flow diagram of an exemplary process of tracking customers and/or other objects through a retail store based on RFID signals, in accordance with some embodiments.

FIG. 6 illustrates a simplified flow diagram of an exemplary process 600 of tracking customers and/or other objects through a retail store 200 based on RFID signals, in accordance with some embodiments. In step 602, the tracking control circuit 106 receives, from a sub-set of one or more RFID tag readers 104 of the multiple RFID tag readers at the retail store, RFID tag information of each detected set of RFID tags of an array 302 of RFID tags 304 fixed within at least one mobile RFID transmitter system 102. Again, the RFID transmitter system 102 is configured to moveably be positioned at substantially any relevant travel area 204 within the retail store 200 where movement of objects (e.g., people 206, carts 208, baskets, pallet jacks, cleaning cart, or other object) through the travel area 204 is to be tracked.

In step 604, a set of one or more tag information evaluation rules is obtained that are used to identify changes in RFID tag information. As described above, the changes are typically changes from a set of base information that is typically learned over time. Further, the rules can define one or more thresholds and/or ranges that are to be considered in evaluating RFID information. In step 606, the tag information evaluation set of rules is used and applied to evaluate over time the received RFID tag information and to identify over time threshold changes from the set of base information of received RFID signals from the array 302 of the RFID tags 304 being read at each of the sub-set of one or more RFID tag readers 104. In some embodiments, for example, the threshold change is consistent with an object (e.g., person 206, cart 208, basket, etc.) traveling between the array 302 of RFID tags and a corresponding one of the sub-set of RFID tag readers.

In step 608, the object is tracked by the tracking control circuit 106 without obtaining a unique identifier of the object as the object moves relative to the RFID transmitter system and along at least a travel area 204 of the retail store 200 in which the one or more RFID transmitter systems 102 are positioned as a function of the detected changes from the base information of the received RFID signals from the array of RFID tags being read over time. In some embodiments, one or more other systems may obtain an identifier of the object (e.g., a customer registering, tracking a customer's user interface unit 118, a customer carrying a previously associated RFID tag (e.g., through an issued customer card, etc.), a predefined and know RFID tag on a cart, or the like). For example, a customer may use their own personal smartphone and an application (APP) operated on the smartphone. Accordingly, the APP provides identifying information that is unique to the customer so that a point-of-sale system associated with the retail store can charge the customer. In other instances, the worker or customer may be associated with a particular scanning device, and the central control circuit 120 can determine an identification of the person based on communications from the scanning device. The tracking control circuit 106, however, typically can detect the object without having to identify the object, and can track the object through one or more portions of the retail store based on direction of movement of the object, the consistent detected changes to RFID tag information, and other such information. In some instances, for example, the tracking control circuit may further use repeated detection of the same RFID tag or collection of tags and/or as a customer pushes a cart or carries a basket through the retail store adding products to the cart or basket.

In some embodiments, a set of item RFID tag evaluation rules is obtained to identify changes in RFID tag information. The item RFID tag evaluation set of rules are applied and used to evaluate RFID tag information associated with multiple different item RFID tags 112 and identify over time threshold changes in one or more characteristics of the RFID tag information corresponding to the multiple item RFID tags being read at each of a sub-set of at least one RFID tag readers 104. The object is tracked without obtaining the identifier of the object as the object moves along at least a travel area 204 as a function of timing of the detected changes in the at least one characteristic of the RFID tag information corresponding to the multiple item RFID tags being read at each of the sub-set of RFID tag readers. Some embodiments further use a tracking set of rules in tracking objects to confirm that the detected changes in at least one characteristic of the RFID tag information corresponding to a subsequent set of RFID tags being read at a subsequent second RFID tag reader of a sub-set of RFID tag readers are within a threshold consistency of detected changes in at least the one characteristic of RFID tag information corresponding to a previous set of multiple RFID tags being read at a previous RFID tag reader of the sub-set of RFID tag readers, and associate the changes corresponding to the subsequent set of RFID tags being read at the subsequent RFID tag reader as being causes by the same object based on the determined consistency.

Some embodiments in utilizing a set of item RFID tag evaluation rules to identify changes in one or more characteristic corresponds to item RFID tags being read further identify at least a threshold increase in variation of RSSI of RFID tags being read at each of a subsequent sub-set of RFID tag readers. Further, some embodiments obtain a set of rules to track the an object, and use that set of rules to evaluate RFID tag information to identify a loss of detection of at least a majority of the array 302 of RFID tags of an RFID transmitter system 102 at the same time corresponding to the object interfering with the majority of the array of RFID tags.

In some instances, a set of rules to track the object can be obtained and used to evaluate RFID tag information and estimate a size of an object based on a quantity of the RFID tags 304 of the array 302 of RFID tags that each have at least a threshold reduction in detected signal strength from the base signal strength. The tracking control circuit 106 can obtain a set of rules to track an object and use that set of rules to evaluate RFID tag information and identify the object is a customer and estimate an age of the customer based on detected changes corresponding to a sequential sets of the RFID tags 304 of the array 302 of RFID of at least a threshold reduction in detected signal strength. The detected change corresponding to the sequential sets of the RFID tags of the array of RFID tags are detected sequential in time. Further, some embodiments use the set of rules to identify a direction the customer is traveling based on the detected sequential sets of the RFID tags of the array of RFID tags. As described above, some embodiments utilize the tracked location of objects in controlling one or more systems of the retail store, such as lighting systems, RFID tag readers, surveillance systems, Scan&Go systems, bar code readers, advertisement systems, and/or other such systems. In some embodiments, it is identified that an object (e.g., a customer, worker, etc.) is a threshold distance from a particular travel area (e.g., a first isle). One or more of a lighting system, a set of RFID tag readers, advertisement systems, and the like can be controlled corresponding to the travel area based on the tracked location of the object.

Figure 7:
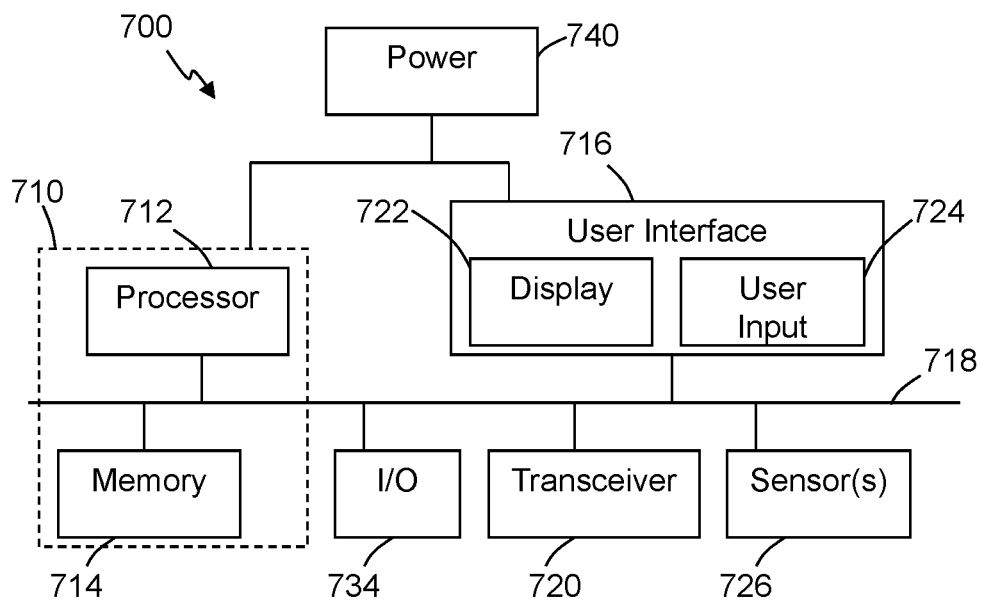
FIG. 7 illustrates an exemplary system for use in implementing methods, techniques, devices, apparatuses, systems, servers, and sources to track customers and/or other objects through a retail store based on RFID signals, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 7 illustrates an exemplary system 700 that may be used for implementing any of the components, circuits, circuitry, systems, functionality, apparatuses, processes, or devices of the retail store RFID customer tracking system 100, the mobile RFID transmitter systems 102, the RFID tag readers 104, the tracking control circuit 106, the central control circuit 120, and/or other above or below mentioned systems or devices, or parts of such circuits, circuitry, functionality, systems, apparatuses, processes, or devices. For example, the system 700 may be used to implement some or all of an RFID tag reader 104, the tracking control circuit 106, and/or other such components, circuitry, functionality and/or devices. However, the use of the system 700 or any portion thereof is certainly not required.

By way of example, the system 700 may comprise a control circuit or processor module 712, memory 714, and one or more communication links, paths, buses or the like 718. Some embodiments may include one or more user interfaces 716, and/or one or more internal and/or external power sources or supplies 740. The control circuit 712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 712 can be part of control circuitry and/or a control system 710, which may be implemented through one or more processors with access to one or more memory 714 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 700 may be used to implement one or more of the above or below, or parts of, components, circuits, systems, processes and the like.

The user interface 716 can allow a user to interact with the system 700 and receive information through the system. In some instances, the user interface 716 includes a display 722 and/or one or more user inputs 724, such as buttons, touch screen, track ball, keyboard, mouse, etc., which can be part of or wired or wirelessly coupled with the system 700.

Typically, the system 700 further includes one or more communication interfaces, ports, transceivers 720 and the like allowing the system 700 to communicate over a communication bus, a distributed computer and/or communication network 108 (e.g., a local area network (LAN), the Internet, wide area network (WAN), etc.), communication link 718, other networks or communication channels with other devices and/or other such communications or combination of two or more of such communication methods. Further the transceiver 720 can be configured for wired, wireless, optical, fiber optical cable, satellite, or other such communication configurations or combinations of two or more of such communications. Some embodiments include one or more input/output (I/O) ports 734 that allow one or more devices to couple with the system 700. The I/O ports can be substantially any relevant port or combinations of ports, such as but not limited to USB, Ethernet, or other such ports. The I/O interface 734 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 726 to provide information to the system and/or sensor information that is communicated to another component, such as the central control circuit 120, scheduling system 116, the tracking control circuit 106, etc. The sensors can include substantially any relevant sensor, such as distance measurement sensors (e.g., optical units, sound/ultrasound units, etc.), optical based scanning sensors to sense and read optical patterns (e.g., bar codes), and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 700 comprises an example of a control and/or processor-based system with the control circuit 712. Again, the control circuit 712 can be implemented through one or more processors, controllers, central processing units, logic, software and the like. Further, in some implementations the control circuit 712 may provide multiprocessor functionality.

The memory 714, which can be accessed by the control circuit 712, typically includes one or more processor readable and/or computer readable media accessed by at least the control circuit 712, and can include volatile and/or nonvolatile media, such as RAM, ROM, EEPROM, flash memory and/or other memory technology. Further, the memory 714 is shown as internal to the control system 710; however, the memory 714 can be internal, external or a combination of internal and external memory. Similarly, some or all of the memory 714 can be internal, external or a combination of internal and external memory of the control circuit 712. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 108. The memory 714 can store code, software, executables, scripts, data, content, lists, programming, programs, log or history data, user information, customer information, product information, and the like. While FIG. 7 illustrates the various components being coupled together via a bus, it is understood that the various components may actually be coupled to the control circuit and/or one or more other components directly.

In some embodiments, retail store RFID object tracking systems are provided and corresponding methods performed by the systems. An RFID customer tracking system, in some embodiments, comprises: a mobile RFID transmitter system comprising an array of multiple RFID tags, wherein the RFID transmitter system is configured to moveably be positioned at substantially any relevant travel area within a retail store where movement of objects through the travel area is to be tracked; multiple RFID tag readers positioned at fixed locations throughout the retail store comprising a first sub-set of at least one of the multiple RFID tag readers positioned to detect RFID signals from the array of multiple RFID tags; a tracking control circuit communicatively coupled with the multiple RFID tag readers, implementing code stored in memory and configured to: receive, from the first sub-set of RFID tag readers, RFID tag information of each detected first set of RFID tags of the array of RFID tags; obtain a first set of rules to identify changes in RFID tag information; use the first set of rules to evaluate over time the received RFID tag information and identify over time threshold changes from a set of base information of received RFID signals from the array of RFID tags being read at each of the first sub-set of RFID tag readers, wherein the threshold change is consistent with a first object traveling between the array of RFID tags and a corresponding one of the first sub-set of RFID tag readers; and track the first object without obtaining a unique identifier of the first object as the first object moves relative to the RFID transmitter system and along at least a first travel area of the retail store in which the RFID transmitter system is positioned as a function of the detected changes from the base information of the received RFID signals from the array of RFID tags being read over time.

Some embodiments provide methods of tracking objects through a retail store based on radio frequency identification (RFID) signals, comprising: by a tracking control circuit: receiving, from a first sub-set of RFID tag readers, RFID tag information of each detected first set of RFID tags of an array of RFID tags fixed within a mobile RFID transmitter system that is configured to moveably be positioned at substantially any relevant travel area within the retail store where movement of objects through the travel area is to be tracked; obtaining a first set of rules to identify changes in RFID tag information; using the first set of rules to evaluate over time the received RFID tag information and identifying over time threshold changes from a set of base information of received RFID signals from the array of RFID tags being read at each of the first sub-set of RFID tag readers, wherein the threshold change is consistent with a first object traveling between the array of RFID tags and a corresponding one of the first sub-set of RFID tag readers; and tracking the first object without obtaining a unique identifier of the first object as the first object moves relative to the RFID transmitter system and along at least a first travel area of the retail store in which the RFID transmitter system is positioned as a function of the detected changes from the base information of the received RFID signals from the array of RFID tags being read over time.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail store radio frequency identification (RFID) customer tracking system, comprising:
    a mobile RFID transmitter system comprising an array of multiple RFID tags, wherein the RFID transmitter system is configured to moveably be positioned at substantially any relevant travel area within a retail store where movement of objects through the travel area is to be tracked;
    multiple RFID tag readers positioned at fixed locations throughout the retail store comprising a first sub-set of at least one of the multiple RFID tag readers positioned to detect RFID signals from the array of multiple RFID tags;
    a tracking control circuit communicatively coupled with the multiple RFID tag readers, implementing code stored in memory and configured to:
    receive, from the first sub-set of RFID tag readers, RFID tag information of each detected first set of RFID tags of the array of RFID tags;
    obtain a first set of rules to identify changes in RFID tag information;
    use the first set of rules to evaluate over time the received RFID tag information and identify over time threshold changes from a set of base information of received RFID signals from the array of RFID tags being read at each of the first sub-set of RFID tag readers, wherein the threshold change is consistent with a first object interfering with the received RFID signals as the first object travels between the array of RFID tags and a corresponding one of the first sub-set of RFID tag readers; and
    track the first object without obtaining a unique identifier of the first object as the first object moves relative to the RFID transmitter system and along at least a first travel area of the retail store in which the RFID transmitter system is positioned as a function of the detected changes from the base information of the received RFID signals from the array of RFID tags being read over time.

2. The system of claim 1, wherein the tracking control circuit is configured to:
    obtain a second set of rules to identify changes in RFID tag information;
    use the second set of rules to evaluate RFID tag information associated with multiple different item RFID tags and identify over time threshold changes in at least one characteristic of the RFID tag information corresponding to the multiple item RFID tags being read at each of a second sub-set of at least one of the multiple RFID tag readers; and
    track the first object without obtaining the identifier of the first object as the first object moves along at least the first travel area as a function of timing of the detected changes in the at least one characteristic of the RFID tag information corresponding to the multiple item RFID tags being read at each of the second sub-set of RFID tag readers.

3. The system of claim 2, wherein the tracking control circuit using the second set of rules in tracking the first object is configured to confirm that the detected changes in the at least one characteristic of the RFID tag information corresponding to a subsequent set of RFID tags being read at a subsequent second RFID tag reader of the second sub-set of RFID tag readers are within a threshold consistency of detected changes in the at least one characteristic of RFID tag information corresponding to the multiple RFID tags being read at a previous first RFID tag reader of the second sub-set of RFID tag readers, and associate the changes corresponding to the subsequent set of RFID tags being read at the second RFID tag reader as being causes by the first object based on the determined consistency.

4. The system of claim 2, wherein the tracking control circuit, in using the second set of rules to identify the changes in the item RFID tags being read, is configured to identify at least a threshold increase in variation of Receive Signal Strength Indicator (RSSI) of RFID tags being read at each of the second sub-set of RFID tag readers.

5. The system of claim 1, wherein the tracking control circuit is configured to:
obtain a second set of rules to track the first object;
use the second set of rules to evaluate RFID tag information and identify a loss of detection of at least a majority of the array of RFID tags at the same time corresponding to the first object interfering with the majority of the array of RFID tags.

6. The system of claim 1, wherein the tracking control circuit is configured to
obtain a second set of rules to track the first object;
use the second set of rules to evaluate RFID tag information and estimate a size of the first object based on a quantity of the RFID tags of the array of RFID tags that each have at least a threshold reduction in detected signal strength from the base signal strength.

7. The system of claim 1, wherein the tracking control circuit is configured to:
obtain a second set of rules to track the first object;
use the second set of rules to evaluate RFID tag information and identify the first object is a customer and estimate an age of the customer based on detected changes corresponding to a sequential sets of the RFID tags of the array of RFID tags of at least a threshold reduction in detected signal strength, wherein the detected change corresponding to the sequential sets of the RFID tags of the array of RFID tags are detected sequential in time.

8. The system of claim 7, wherein the tracking control circuit, in using the second set of rules, is configured to identify a direction the customer is traveling based on the detected sequential sets of the RFID tags of the array of RFID tags.

9. The system of claim 1, the tracking control circuit further couples with lighting systems and surveillance systems of the retail store, and based on location information corresponding to the tracked first object within the retail store the tracking control circuit is configured to activate and deactivate some of the lighting systems, the surveillance systems and RFID tag readers.

10. A method of tracking customers through a retail store based on radio frequency identification (RFID) signals, comprising:
by a tracking control circuit:
receiving, from a first sub-set of RFID tag readers, RFID tag information of each detected first set of RFID tags of an array of RFID tags fixed within a mobile RFID transmitter system that is configured to moveably be positioned at substantially any relevant travel area within the retail store where movement of objects through the travel area is to be tracked;
obtaining a first set of rules to identify changes in RFID tag information;
using the first set of rules to evaluate over time the received RFID tag information and identifying over time threshold changes from a set of base information of received RFID signals from the array of RFID tags being read at each of the first sub-set of RFID tag readers, wherein the threshold change is consistent with a first object interfering with the received RFID signals as the first object travels between the array of RFID tags and a corresponding one of the first sub-set of RFID tag readers; and
tracking the first object without obtaining a unique identifier of the first object as the first object moves relative to the RFID transmitter system and along at least a first travel area of the retail store in which the RFID transmitter system is positioned as a function of the detected changes from the base information of the received RFID signals from the array of RFID tags being read over time.

11. The method of claim 10, further comprising:
obtaining a second set of rules to identify changes in RFID tag information;
using the second set of rules to evaluate RFID tag information associated with multiple different item RFID tags and identify over time threshold changes in at least one characteristic of the RFID tag information corresponding to the multiple item RFID tags being read at each of a second sub-set of at least one RFID tag readers; and
tracking the first object without obtaining the identifier of the first object as the first object moves along at least the first travel area as a function of timing of the detected changes in the at least one characteristic of the RFID tag information corresponding to the multiple item RFID tags being read at each of the second sub-set of RFID tag readers.

12. The method of claim 11, wherein the using the second set of rules in tracking the first object comprises:
confirming that the detected changes in the at least one characteristic of the RFID tag information corresponding to a subsequent set of RFID tags being read at a subsequent second RFID tag reader of the second sub-set of RFID tag readers are within a threshold consistency of detected changes in the at least one characteristic of RFID tag information corresponding to the multiple RFID tags being read at a previous first RFID tag reader of the second sub-set of RFID tag readers; and
associating the changes corresponding to the subsequent set of RFID tags being read at the second RFID tag reader as being causes by the first object based on the determined consistency.

13. The method of claim 11, wherein the using the second set of rules to identify the changes in the item RFID tags being read comprises identifying at least a threshold increase in variation of Receive Signal Strength Indicator (RSSI) of RFID tags being read at each of the second sub-set of RFID tag readers.

14. The method of claim 10, further comprising:
obtaining a second set of rules to track the first object;
using the second set of rules to evaluate RFID tag information; and
identifying a loss of detection of at least a majority of the array of RFID tags at the same time corresponding to the first object interfering with the majority of the array of RFID tags.

15. The method of claim 10, further comprising:
obtaining a second set of rules to track the first object;
using the second set of rules to evaluate RFID tag information and estimating a size of the first object based on a quantity of the RFID tags of the array of RFID tags that each have at least a threshold reduction in detected signal strength from the base signal strength.

16. The method of claim 10, further comprising:
obtaining a second set of rules to track the first object;
using the second set of rules to evaluate RFID tag information and identifying the first object is a customer and estimating an age of the customer based on detected changes corresponding to sequential sets of the RFID tags of the array of RFID tags of at least a threshold reduction in detected signal strength, wherein the detected changes corresponding to the sequential sets of the RFID tags of the array of RFID tags are detected sequential in time.

17. The method of claim 16, further comprising:
using the second set of rules and identifying a direction the customer is traveling based on the detected sequential sets of the RFID tags of the array of RFID tags.

18. The method of claim 10, further comprising:
identifying that the first object is a threshold distance from the first travel area; and
controlling a lighting system and a set of RFID tag readers corresponding to the first travel area based on the tracked location of the first object.

19. The system of claim 1, wherein the mobile RFID transmitter system comprising a mobile housing within which the array of multiple RFID tags are secured, wherein the housing is configured to protect the array of multiple RFID tags as each of the objects travel over the mobile RFID transmitter system and at least a subset of the array of multiple RFID tags; and
wherein the array of multiple RFID tags are arranged within the housing.

20. The system of claim 1, wherein the threshold change consistent with the first object interfering with the received RFID signals comprises the threshold change resulting from at least one of interference, absorption and reflection caused by the first object as the first object travels between the array of RFID tags and the corresponding one of the first sub-set of RFID tag readers.

* * * * *